March 8, 1927.
LE ROY RUCKEL
WINDSHIELD CLEANER
Filed April 9, 1923
1,619,885
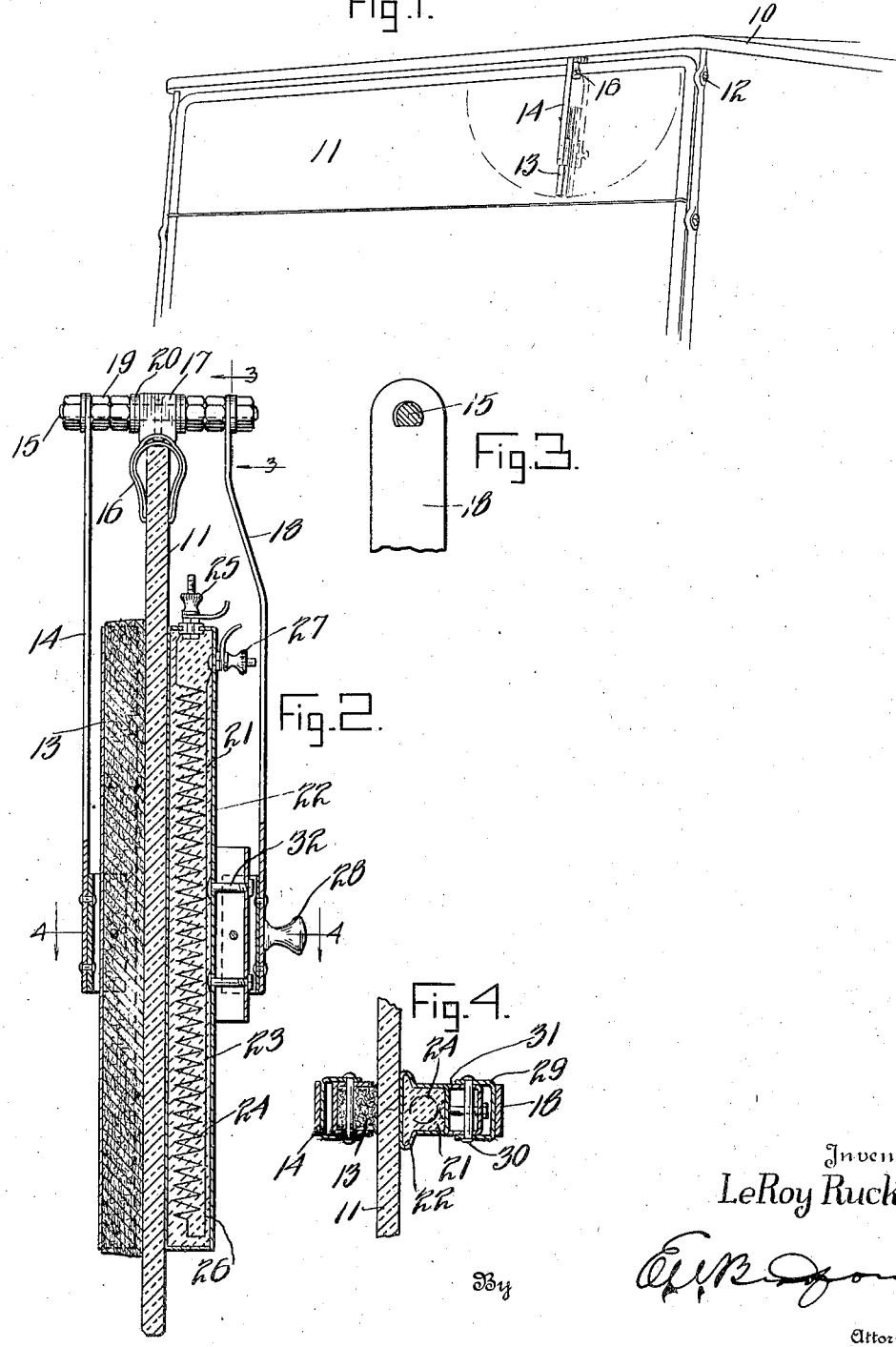
Inventor
LeRoy Ruckel
Attorney Patented Mar. 8, 1927.

1,619,885

UNITED STATES PATENT OFFICE.

LE ROY RUCKEL, OF STAMFORD, CONNECTICUT.

WINDSHIELD CLEANER.

Application filed April 9, 1923. Serial No. 630,933.

My said invention relates to a windshield vision glass cleaner of improved type and it is an object of the same to provide a cleaner which will serve not only to remove rain and dust from the outside but will prevent ice forming on the same by glass being in contact with a heating element, which heat penetrates through the glass and which will also remove the vapor or mist that forms on the inside of the windshield and clouds the same on rise of temperature in the car.

Referring to the accompanying drawings, which are made a part hereof and on which similar reference characters indicate similar parts, Figure 1 is a perspective of a part of an automobile with my improved device applied thereto, Figure 2 a vertical transverse section of the device, Figure 3 a section on line 3—3 of Figure 2, and Figure 4 a section on line 4—4 of Figure 2.

In the drawing reference character 10 indicates generally the top of an automobile having a windshield of conventional form with an upper part 11 pivoted at 12. According to my invention I provide a windshield cleaning pad or scraper 13 of ordinary form supported by a rockarm 14 pivotally mounted on a bolt 15. This pad is located on the outside of the windshield in usual manner and operates in known fashion, it being understood that other forms of pad may be substituted for the one here shown. For holding the device in place I have provided a clamp 16 engageable over the top of the upper windshield member and capable of being moved to any desired position on the same. This clamp is carried by a support 17 through which the bolt 15 passes. The bolt 15 may be passed through the windshield frame if the clamp is not to be used. The rockarm 14 on the other side may be adjustably positioned by means of nuts 19 and washers 20 on the bolt so as to adjust the tension of the inner and outer pads in proper manner.

The rockarm 18 is similar to the rockarm 14 and carries a cleaning device similar in form to the pad 13. The inner cleaning device 21, however, has a metallic envelope 22 within which is a mass 23 of porcelain or other heat resisting material which may be surrounded by mica insulation or the like. Embedded in the porcelain is a heating element here shown as a wire 24. The wire is connected to ends of binding posts 25 and 27 leading to a switch or to a switch and a rheostat. The lower end of the wire is carried back inside of the envelope to the binding post.

The arm 18 is provided with a handle 28 and the arm and handle are both rigidly connected to a U-shaped member 29 which may be made of sheet metal and which has a pin 30 pivotally connecting it to a U-shaped member 31 which may be in the form of an extension of the casting 22 but is here shown as fixed thereto by small bolts 32.

In the operation of my device it will be seen that by exerting pressure on the handle 28 from one side to the other the inner cleaner will swing in an arc as indicated in Figure 1. The rockarm 18 has an opening flattened at one side to engage a flat surface on the bolt 15. The corresponding flat surfaces prevent relative rotation between the bolt and the arm. The arm 14 is similarly connected to the bolt and it will therefore be seen that when the handle 28 is moved to and fro the rockarm will also be swung to and fro so that the pad 13 and the inner cleaner 21 will swing back and forth in synchronism. The outer cleaner provides in well known manner for removal of dust and water from the outside of the windshield while the inner cleaner and heating element not only removes dust but also wipes off any moisture that may collect and by reason of its temperature causes such moisture to evaporate rapidly so as not to return it to the inner face of the shield. In addition, it also warms the outer surface of the shield to a certain extent thus tending to prevent the collection of moisture and freezing of the same thereon.

It will be obvious to those skilled in the art that many modifications and changes may be made in this device without departing from the spirit of the invention. For this reason I do not limit myself to the specific form of the invention shown in the drawings and described in the specification but only as indicated in the appended claim.

Having thus fully described my said invention, what I claim as new and desire to secure by Letters Patent, is:

A windshield cleaner comprising a support mounted on a windshield, a wiper carried by said support to be reciprocated over the windshield glass and comprising an elongated metallic casing having a flattened face directly engaging said glass, a convoluted heating element incorporated in said wiper and insulated from the casing, and means whereby the wiper may be actuated, substantially as set forth.

In witness whereof, I have hereunto set my hand at Stamford, Connecticut, this fourth day of April, A. D. nineteen hundred and twenty-three.

LE ROY RUCKEL.